US012747840B2

(12) United States Patent
Van Bommel et al.

(10) Patent No.: US 12,747,840 B2
(45) Date of Patent: Sep. 29, 2026

(54) LED FILAMENT AND A LAMP

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 17/923,649

(22) PCT Filed: Apr. 30, 2021

(86) PCT No.: PCT/EP2021/061423

§ 371 (c)(1),
(2) Date: Nov. 7, 2022

(87) PCT Pub. No.: WO2021/224134

PCT Pub. Date: Nov. 11, 2021

(65) Prior Publication Data

US 2023/0204169 A1 Jun. 29, 2023

(30) Foreign Application Priority Data

May 7, 2020 (EP) .................................... 20173386

(51) Int. Cl.
*F21S 4/22* (2016.01)
*F21K 9/232* (2016.01)
(Continued)

(52) U.S. Cl.
CPC ................ *F21S 4/22* (2016.01); *F21K 9/232* (2016.08); *F21Y 2103/10* (2016.08); *F21Y 2115/10* (2016.08)

(58) Field of Classification Search
CPC ..... F21K 9/232; F21S 4/22; F21S 4/24; F21S 4/26
See application file for complete search history.

(56) References Cited

U.S. PATENT DOCUMENTS 8,226,266 B2 * 7/2012 Chiang .................. F21K 9/232
362/249.02
8,536,807 B2 * 9/2013 Lin ......................... F21V 29/85
315/32
(Continued)

FOREIGN PATENT DOCUMENTS

CN 201944606 U 8/2011
CN 108916677 A 11/2018
(Continued)

*Primary Examiner* — William N Harris

(57) ABSTRACT

The present invention relates to an LED filament (100) comprising a carrier (110) comprising a plurality of LEDs (140) arranged in at least two columns of LEDs (150, 160). The plurality of LEDs (140) are grouped into at least two different subsets of LEDs (120, 130), wherein a first subset of the LEDs (120) is configured to emit light of a first color temperature, CT1, and a second subset of the LEDs (130) is configured to emit light of a second color temperature, CT2, CT2 being different from CT1. The LEDs (140) of the at least two different subsets of LEDs (120, 130) are arranged in an alternating intersecting configuration in the at least two columns of LEDs (150, 160) such that each column (150) comprises alternating segments (132, 124) configured to emit light of the first and the second color temperatures, respectively.

10 Claims, 5 Drawing Sheets

(51) Int. Cl.
*F21Y 103/10* (2016.01)
*F21Y 115/10* (2016.01)

(56) References Cited

U.S. PATENT DOCUMENTS

| | | | | |
|---|---|---|---|---|
| 8,860,309 | B2 * | 10/2014 | Huang | F21K 9/23 315/250 |
| 8,956,030 | B1 * | 2/2015 | Wesson | F21S 43/19 362/652 |
| 9,234,655 | B2 * | 1/2016 | Progl | F21V 29/85 |
| 2008/0174224 | A1 * | 7/2008 | Liao | H01J 5/50 313/318.01 |
| 2013/0271989 | A1 * | 10/2013 | Hussell | F21K 9/232 362/249.02 |
| 2014/0362565 | A1 * | 12/2014 | Yao | F21K 9/235 362/223 |
| 2015/0062892 | A1 * | 3/2015 | Krames | F21K 9/235 362/231 |
| 2017/0012177 | A1 * | 1/2017 | Trottier | F21K 9/00 |
| 2018/0328543 | A1 | 11/2018 | Bergmann | |
| 2019/0017657 | A1 | 1/2019 | Kim | |
| 2019/0139943 | A1 * | 5/2019 | Tiwari | F21K 9/232 |
| 2020/0144230 | A1 * | 5/2020 | Lin | H10H 20/857 |
| 2020/0166182 | A1 * | 5/2020 | Yeung | H01L 27/153 |
| 2020/0303356 | A1 * | 9/2020 | Li | F21K 9/238 |
| 2020/0332962 | A1 * | 10/2020 | Chen | H05B 45/20 |

FOREIGN PATENT DOCUMENTS

| | | | |
|---|---|---|---|
| CN | 208871526 | U | 5/2019 |
| CN | 209592030 | U | 11/2019 |
| EP | 2784372 | A1 | 10/2014 |
| EP | 3618111 | A1 | 3/2020 |
| JP | 2015097196 | A | 5/2015 |
| JP | 2015534703 | A | 12/2015 |
| JP | 2016167518 | A | 9/2016 |
| JP | 2017054749 | A | 3/2017 |
| JP | 2019197906 | A | 11/2019 |
| WO | 2013055650 | A1 | 4/2013 |
| WO | 2018157428 | A1 | 9/2018 |
| WO | 2019015763 | A1 | 1/2019 |
| WO | 2019166273 | A1 | 9/2019 |
| WO | 2019179228 | A1 | 9/2019 |
| WO | 2020016058 | A1 | 1/2020 |

* cited by examiner

LED FILAMENT AND A LAMP

CROSS-REFERENCE TO PRIOR APPLICATIONS

This application is the U.S. National Phase application under 35 U.S.C. § 371 of International Application No. PCT/EP2021/061423, filed on Apr. 30, 2021, which claims the benefit of European patent application Ser. No. 20173386.2, filed on May 7, 2020. These applications are hereby incorporated by reference herein.

FIELD OF THE INVENTION

The invention relates to an LED filament and a lamp comprising an LED filament.

BACKGROUND OF THE INVENTION

Over the past years, various types of filaments and lamps using such filaments have been developed. An example of such filaments is an LED filament. One of the trends in such filaments is color temperature tunability. The color temperature tunable filaments are capable of emitting light with different color temperatures. However, color mixing in such color temperature tunable filaments is still an issue. In addition, such color temperature tunable filaments may look broken, in the case of malfunctioning.

SUMMARY OF THE INVENTION

It is an object of the present invention to overcome at least some of the above problems.

According to a first aspect an LED filament is provided. The LED filament comprising a carrier comprising a plurality of LEDs arranged in at least two columns of LEDs; wherein the plurality of LEDs are grouped into at least two different subsets of LEDs, wherein a first subset of the LEDs is configured to emit light of a first color temperature, CT1, and a second subset of the LEDs is configured to emit light of a second color temperature, CT2 , CT2 being different from CT1; and wherein the LEDs of the at least two different subsets of LEDs are arranged in an alternating intersecting configuration in the at least two columns of LEDs such that each column comprises alternating segments configured to emit light of the first and the second color temperatures, respectively. Thereby, improved color mixing and color temperature tunability may be achieved. Numbers of the columns of LEDs, subsets of LEDs, alternating segments of each column and lengths of the alternating segments of each column may be chosen to further improve color mixing. The number of alternating segments may preferably be at least 3. The number of alternating segments may more preferably be at least 5. The number of alternating segments may most preferably be at least 7 such as 10 or 15. Each column of LEDs may preferably comprise 30 LEDs. Each column of LEDs may more preferably comprise 40 LEDs. Each column of LEDs may most preferably comprise 50 LEDs such as 70 or 120 LEDs. For instance, the LED filament may comprise a plurality of LEDs arranged into three columns of LEDs and the plurality of LEDs may be grouped into three different subsets of LEDs. The first subset of LEDs may be configured to emit light of a high color temperature. The second subset of LEDs may be configured to emit light of a moderate color temperature. The third subset of LEDs may be configured to emit light of a low color temperature. Further improved appearance of the LED filament may be achieved, for example, the LED filament may be designed to not look broken or looks less broken in the case of malfunctioning of a subset of LEDs. The first subset of LEDs emitting light of the first color temperature and the second subset of LEDs emitting light of the second color temperature may be provided by depositing different color temperature emitting phosphors on different subsets of LEDs. Alternatively, the first subset of LEDs emitting light of the first color temperature and/or the second subset of LEDs emitting light of the second color temperature may be provided by an RGB column instead of a phosphor converted column.

By an "alternating intersecting configuration" is hereby meant that the at least two subsets of LEDs are arranged into alternating segments along a length of the at least two columns of LEDs and that those alternating segments intersect each other. In other words, the at least two columns of LEDs comprise a first column and a second column. The first subset of the LEDs is arranged in the first and the second columns of the at least two columns of the LEDs. The second subset of the LEDs is also arranged in the first and the second columns of the at least two columns of the LEDs. For instance, the first subset, emitting light of the first color temperature, may be represented by "A". The second subset, emitting light of the second color temperature may be represented by "B". The alternating segments along the length of a first column of the at least two columns of LEDs may be ABAB. The alternating segments along the length of a second column of the at least two columns of LEDs may correspondingly be BABA. The at least two columns of LEDs may have a minimum of four alternative segments along their respective lengths i.e. ABAB or BABA. The at least two columns of LEDs may have any more numbers of alternating segments along their respective lengths.

An LED filament is providing LED filament light and comprises a plurality of light emitting diodes (LEDs) arranged in a linear array. Preferably, the LED filament has a length L and a width W, wherein L>5 W. The LED filament may be arranged in a straight configuration or in a non-straight configuration such as for example a curved configuration, a 2D/3D spiral or a helix. Preferably, the LEDs are arranged on an elongated carrier like for instance a substrate, that may be rigid (made from e.g. a polymer, glass, quartz, metal or sapphire) or flexible (e.g. made of a polymer or metal e.g. a film or foil). The substrate may comprise a glue e.g. a surface of the substrate may comprise a glue. The glue may be covered by a cover such that the cover may be removed, and the substrate may be fixed on a surface. In case the carrier comprises a first major surface and an opposite second major surface, the LEDs are arranged on at least one of these surfaces. The carrier may be reflective or light transmissive, such as translucent and preferably transparent. The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods. The LED filament may comprise multiple sub-filaments.

Each subset of LEDs may comprise a plurality of LEDs, wherein the plurality of LEDs in a subset of LEDs may electrically be connected such that each subset of LEDs may independently be controllable. Thereby, a tunable color temperature LED filament may be achieved. The plurality of LEDs in a subset of LEDs may preferably be connected in series. By "independently controllable" is hereby meant that each subset of LEDs may be controllable regardless of status of other subsets of LEDs. For instance, the first subset of LEDs may be turned on, off, or an intensity of the first subset of LEDs may be varied regardless of status of the second subset of LEDs.

A distance (D) between the two columns of LEDs may be in a range of 0.05 to 3 mm. Thereby, an LED filament with an improved color mixing may be achieved. This may in addition result into appearance of a single column of LEDs i.e. not separate columns of LEDs. In addition, the distance of 0.05 to 3 mm may provide a minimum needed distance for reliability reasons.

A number of LEDs per segment may at least be 3, preferably at least 5, more preferably at least 7. Thereby, an LED filament with an improved color mixing may be achieved.

A length (LS) of each segment may be in a range of 5 to 30 mm. Thereby, an LED filament with an improved color mixing may be achieved. In addition, the segment length in the range of 5 to 30 mm may not affect or, at least, may not significantly affect the spectral-spatial light distribution and may not increase the complexity of the circuitry.

A length (LF) of the LED filament may be in a range of 3 to 100 cm. The LED filament length of below 3 cm may not be considered as an LED filament. The LED filaments may be provided with various lengths, depending on their desired shape and application. For instance, 100 cm long LED filaments may be used in a three-dimensional shaped configurations such as a spiral or a helix shaped configurations.

The first subset of LEDs may be encapsulated by a first encapsulant comprising a first luminescent material. The second subset of LEDs may be encapsulated by a second encapsulant comprising a second luminescent material. The first and second encapsulants may be different. The first and the second encapsulants may differ in one or more of the following: concentration of luminescent material, thickness, and/or luminescent material type. The luminescent material may e.g. be a phosphor e.g. an inorganic phosphor or combinations of phosphors. The first luminescent material may be a phosphor of a first type. The second luminescent material may be a phosphor of a second type. The first subset of LEDs may comprise e.g. blue LEDs with a first encapsulant comprising a phosphor. The second subset of LEDs may comprise blue and red LEDs with a second encapsulant comprising a phosphor.

The at least two different subsets of LEDs may be placed onto the carrier followed by dispensing different encapsulants comprising different luminescent materials. There may be a gap between an encapsulant of the first column of LEDs and an encapsulant of the second column of LEDs. The presence of the gap between such encapsulants may improve spatial distribution of the emitted light by the LED filament. There may be no gap between an encapsulant of the first column of LEDs and an encapsulant of the second column of LEDs. The absence of the gap between such encapsulants may improve aesthetics and/or manufacturability.

The carrier may be flexible. The carrier may be light transmissive. The carrier may be a flexible and foldable substrate. The flexible or foldable carrier may require a greater number of alternating segments than a rigid carrier due to folding or bending of the carrier.

The carrier may be reflective and may have two opposing surfaces. The at least two columns of LEDs may be arranged on a first surface of the two opposing surfaces. A second surface of the two opposing surfaces may comprise at least two columns of LEDs arranged as the at least two columns of LEDs on the first surface. Thereby a higher intensity LED filament may be achieved due to emission from both opposing surfaces of the carrier with an even more improved color mixing.

The first color temperature (CT1) may be larger than 2500 K (CT1>2500 K). The second color temperature (CT2) may be smaller than 2500 K (CT2<2500 K), wherein CT1−CT2>500 K. In other words, the first color temperature may correspond to a warm white color temperature. The second color temperature may correspond to a cold white color temperature. The abovementioned color temperature criteria may improve a color temperature tunability of the LED filament.

According to a second aspect a lamp is provided. The lamp comprising an LED filament according to the first aspect. This second aspect may generally present the same or corresponding advantages as the first aspect.

The LED filament of the lamp according to the second aspect may be arranged as a helix. The carrier comprising a plurality of LEDs may be arranged as a helix i.e. helically shaped. Thereby, the at least two columns of LEDs may be helically shaped. The LED filament of the lamp may be arranged in any other shapes.

The two columns of LEDs may be arranged at a distance, D, from each other. The helix may have a pitch, P, wherein D<0.3 P, preferably D<0.2 P, more preferably D<0.1 P. A minimum number of segments per loop in the helix may at least be 2, more preferably at least 3, most preferably at least 4. Such minimum number of segments may improve the special spectral distribution.

A controller may be configured to independently control the first subset of LEDs and the second subset of LEDs. Thereby, the first and the second subset of LEDs may independently be controllable.

According to an alternative aspect a lamp is provided. The lamp comprising an LED filament comprising a carrier comprising a plurality of LEDs arranged in at least two columns of LEDs. According to this alternative aspect the columns of LEDs are arranged at a distance, D, from each other. Further, according to this alternative aspect the LED filament is arranged as a helix wherein the helix has a pitch, P, wherein D<0.3 P, preferably D<0.2 P, more preferably D<0.1 P. A first column, of the at least two columns, is configured to emit light of the first color temperature and a second column, of the at least two columns, is configured to emit light of the second color temperature. Moreover, there is no alternating segments in the at least two columns in this alternative aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to the appended drawings showing embodiments of the invention. The figures should not be considered limiting the invention to the specific embodiment.

instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
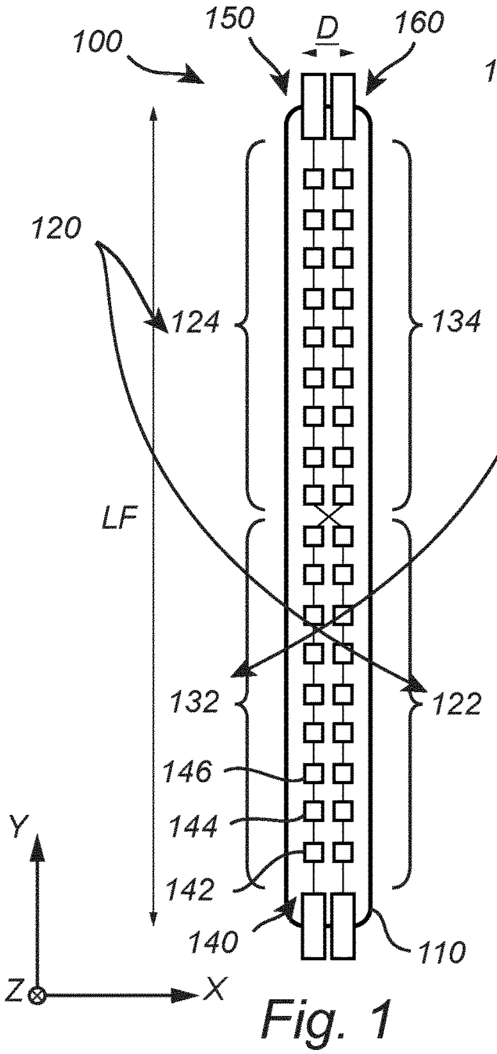
FIG. 1 schematically illustrates an LED filament comprising a plurality of LEDs arranged in two columns.

In connection with FIG. 1, an LED filament is illustrated. In FIG. 1, directions Y and X respectively indicates a longitudinal and a horizontal direction of the LED filament 100. In FIG. 1, direction Z indicates a direction perpendicular to the X and Y directions. The LED filament 100 shown in FIG. 1 comprises a carrier 110. The carrier 110 may have a one-dimensional shape having two opposing surfaces. The carrier 110 may have any other shape. FIG. 1 shows a front surface of the carrier 110. The carrier 110 may be a substrate. The carrier 110 may be flexible such as a flexible substrate. The carrier 110 may be light transmissive. The carrier 110 may be formed of a polymer and/or polyimide.

FIG. 1 shows that the carrier 110 comprises a plurality of LEDs 140. The plurality of LEDs 140 may be arranged on a surface of the carrier 110. The plurality of LEDs 140 may be arranged on the surface of the carrier 110 in a manner which per se is known in the art. For instance, the plurality of LEDs 140 may be attached via a glue or a solder to the carrier 110. In the case that the carrier 110 has two-opposing surfaces, each of the two opposing surfaces of the carrier 110 may comprise a plurality of LEDs 140. The plurality of LEDs 140 is arranged in at least two columns of LEDs 150 and 160. FIG. 1 shows that the plurality of LEDs 140 is arranged in two columns of LEDs 150 and 160. The two columns of LEDs 150 and 160, shown in FIG. 1, extend along the Y direction. The plurality of LEDs 140 may be arranged in more than two columns of LEDs 150 and 160 such as three or four columns. A distance (D) between the two columns of LEDs 150, 160 may be in a range of 0.05 to 3 mm. A length (LF) of the LED filament 100 may be in a range of 3 to 100 cm.

FIG. 1 further shows that the plurality of LEDs 140 is grouped into two different subsets of LEDs 120, 130. Each subset of LEDs 120, 130 may comprise a plurality of LEDs 140. The plurality of LEDs in subset of LEDs 120, 130 may be electrically connected such that subset of LEDs 120, 130 may independently be controllable. FIG. 1 shows individual LEDs such as LEDs 142, 144, and 146 which are electrically connected to each other. The plurality of LEDs 140 may be connected to each other in a manner which per se is known in the art. For instance, the plurality of LEDs 140 may be connected via wirebonds and/or an electrical circuit on the carrier 110. A number of LEDs per segment may preferably be at least 3. The number of LEDs per segment may more preferably be at least 5. The number of LEDs per segment may most preferably be at least 7. The plurality of LEDs 140 may be grouped into more than two different subsets of LEDs 120, 130 such as three subsets or four subsets. A first subset of the LEDs 120, shown in FIG. 1, is configured to emit light of a first color temperature (CT1). A second subset of the LEDs 130, shown in FIG. 1, is configured to emit light of a second color temperature (CT2). The second color temperature (CT2) is different from the first color temperature (CT1). The first color temperature (CT1) may be larger than 2500 K (CT1>2500 K). The second color temperature (CT2) may be smaller than 2500 K (CT2<2500 K). A difference between the first and the second color temperature may be larger than 500 K (CT1>500 K). The first subset 120 of LEDs may be encapsulated by a first encapsulant comprising a first luminescent material. The second subset 130 of LEDs may be encapsulated by a second encapsulant comprising a second luminescent material. The first and the second encapsulants may be different. The encapsulant of the first subset 120 of LEDs and the encapsulant of the second subset 130 of LEDs may be different. The encapsulant of the first 120 and the second subset 130 of LEDs may have different thicknesses. Alternatively, or in combination, the concentration of the luminescent material of the encapsulant of the first 120 and the second subset 130 of LEDs may be different. Alternatively, or in combination, the type of the luminescent material of the encapsulant of the first 120 and the second subset 130 of LEDs may be different. For instance, different color temperature emitting phosphors may be deposited on different subsets of LEDs. The plurality of LEDs may further comprise colored LEDs e.g. RGB LEDs. For instance, the plurality of LEDs 140 may be grouped into three different subsets of LEDs. A first subset of LEDs may be configured to emit light of a high color temperature. A second subset of LEDs may be configured to emit light of a low color temperature. A third subset of LEDs may comprise colored LEDs e.g. RGB LEDs.

FIG. 1 further shows that the LEDs 140 of the at least two different subsets of LEDs 120, 130 are arranged in an alternating intersecting configuration in the at least two columns of LEDs 150, 160. As shown in FIG. 1, the column 150 comprises alternating segments 132 and 124 configured to emit light of the first and the second color temperatures, respectively. Accordingly, the column 160 comprises alternating segments 134 and 122 configured to emit light of the first and the second color temperatures, respectively. FIG. 1 shows that each column comprises two segments. A length (LS) of each segment may be in a range of 5 to 30 mm.

Figure 2:
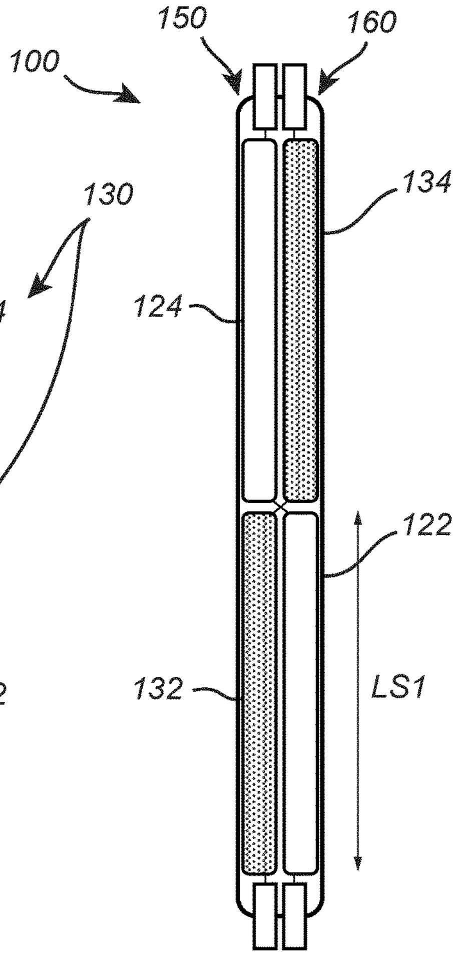
FIG. 2 schematically illustrates an LED filament comprising two columns, each column comprising two segments.

In connection with FIG. 2, another LED filament 100 is shown. The LED filament shown in FIG. 2 comprises a plurality of LEDs, arranged in two columns of LEDs 150 and 160. FIG. 2 further shows that the plurality of LEDs is grouped into two different subsets of LEDs 120, 130. FIG. 2 shows that the first column 150 comprises alternating segments 132 and 124 configured to emit light of the first and the second color temperatures, respectively. FIG. 2 further shows that the second column 160 comprises alternating segments 134 and 122 configured to emit light of the first and the second color temperatures, respectively. FIG. 2 shows that the segments 132 and 124 have the same length and the segments 122 and 134 have the same length. However, the 132 and 124 may have different lengths and the segments 122 and 134 may have different lengths.

Figure 3:
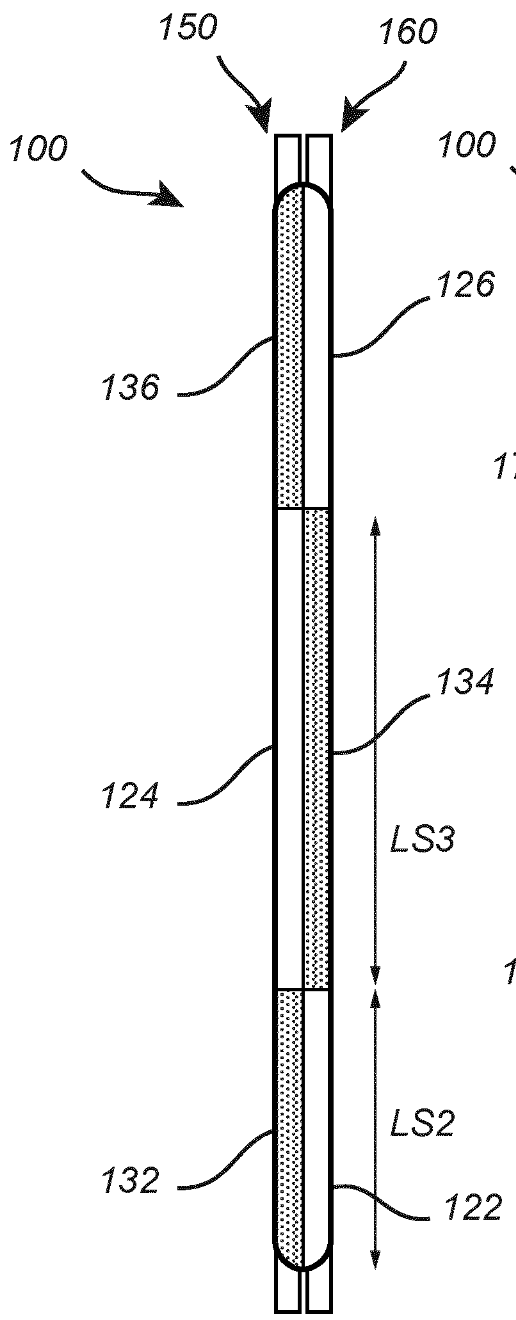
FIG. 3 schematically illustrates an LED filament comprising two columns, each column comprising three segments.

In connection with FIG. 3, yet another LED filament 100 is shown. The LED filament shown in FIG. 3 comprises a plurality of LEDs, arranged in two columns of LEDs 150 and 160. FIG. 3 further shows that the plurality of LEDs is grouped into two different subsets of LEDs 120, 130. FIG. 3 shows that the first column 150 comprises alternating segments 132, 124 and 136. The segments 132 and 136 are configured to emit light of the first color temperature. The segment 124 is configured to emit light of the second color temperature. FIG. 3 further shows that the second column 160 comprises alternating segments 122, 134, and 126. The segment 134 is configured to emit light of the first color temperature. The segments 122 and 126 are configured to emit light of the second color temperatures. FIG. 3 shows that the segments 132, 124 and 136 have different lengths and the segments 122, 134 and 126 have different lengths.

Figure 4:
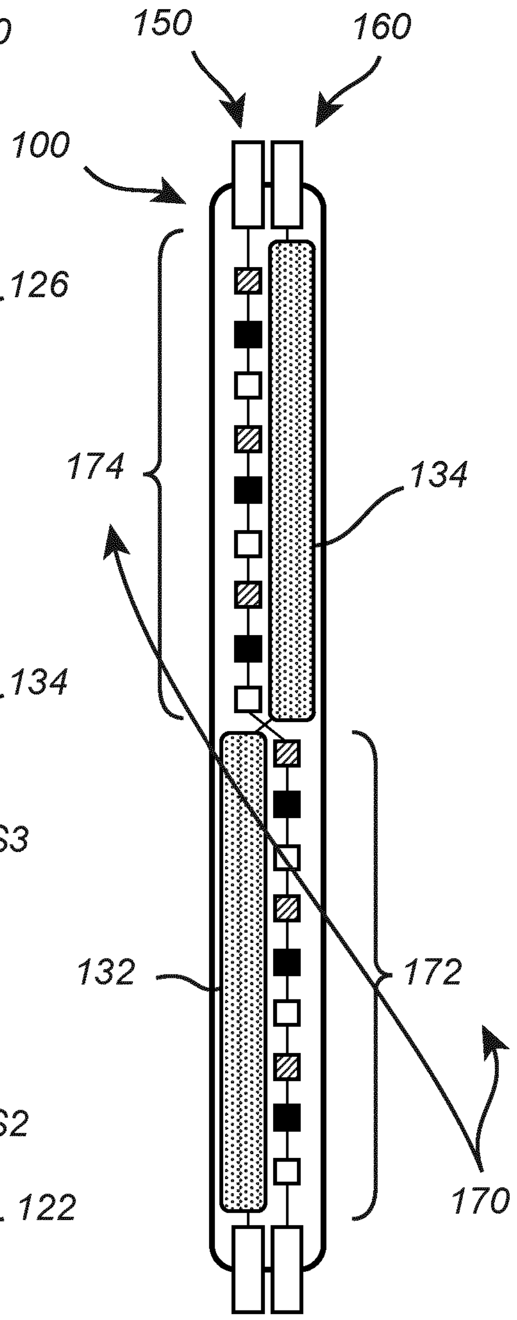
FIG. 4 schematically illustrates an LED filament comprising a plurality of LEDs and colored LEDs arranged in two columns.

In connection with FIG. 4, yet another LED filament 100 is shown. The LED filament 100 shown in FIG. 4 is similar to the LED filament 100 shown in FIG. 2 except that one of the two subsets of LEDs comprises colored LEDs e.g. RGB LEDs and the other subset of LEDs is configured to emit light of a color temperatures such high or low color temperature. FIG. 4 shows that the first column 150 comprises alternating segments 132 and 174 configured to respectively emit light of a color temperature and a colored light. FIG. 2 further shows that the second column 160 comprises alternating segments 134 and 172 configured to respectively emit light of the color temperature and a colored light.

Figure 5A:
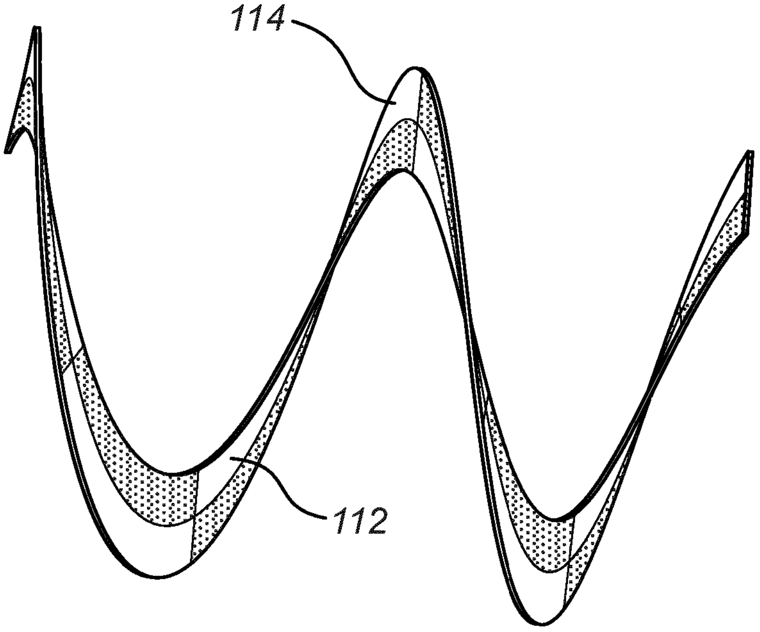
FIG. 5*a* schematically illustrates an LED filament comprising a plurality of LEDs arranged on two opposing surfaces of a carrier.
Figure 5B:
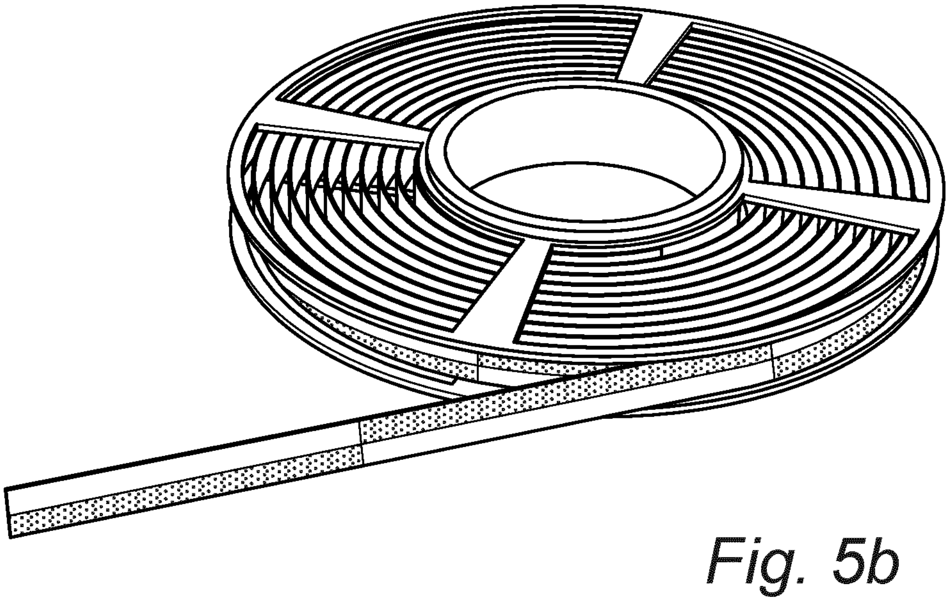
FIG. 5*b* schematically illustrates the LED filament of FIG. 5*a* wrapped around a roll.

In connection with FIG. 5*a*, an LED filament 100 comprising a carrier 110 is shown. The carrier 110 shown in FIG. 5*a* is reflective. The carrier 110 shown in FIG. 5*a* is flexible. The carrier 110 shown in FIG. 5*a* has two opposing surfaces 112, 114. FIG. 5*a* shows that the at least two columns of LEDs 150, 160 are arranged on a first surface 112 of the two opposing surfaces 112, 114. FIG. 5*a* further shows that a second surface 114 of the two opposing surfaces 112, 114 also comprises at least two columns of LEDs 150', 160'. The two column of LEDs 150', 160'arranged on the second surface 114 of the two opposing surfaces 112, 114 are arranged as the at least two columns of LEDs 150, 160 on the first surface 112. In other words, two column of LEDs 150', 160'arranged on the second surface 114 of the two opposing surfaces 112, 114 are arranged in a similar way as the column of LEDs 150, 160 arranged on the first surface 112 of the two opposing surfaces 112, 114. FIG. 5*b* schematically illustrates the LED filament of FIG. 5*a* wrapped around a roll. The LED filament 100 shown in FIG. 5*a* and b may be used for decorative purposes.

Figure 6:
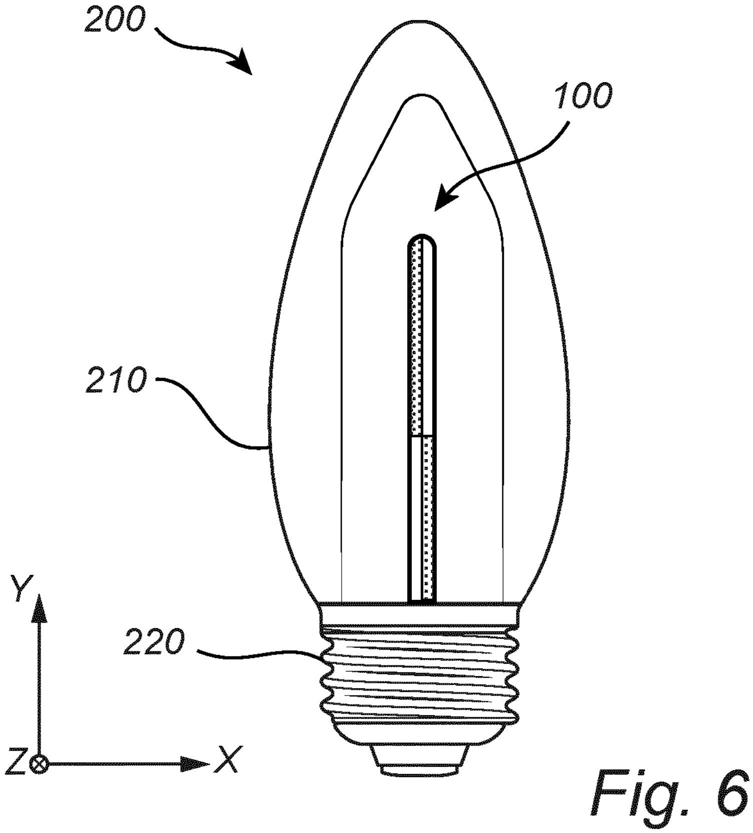
FIG. 6 schematically illustrates a lamp comprising the LED filament shown in FIG. 2.

In connection with FIG. 6, a lamp 200 is shown. The lamp shown in FIG. 6 comprises an LED filament 100. The LED filament 100 shown in FIG. 6 is similar to the LED filament of FIG. 2, described above. The lamp 200 further comprises an envelope 210. The envelope 210 may be a conventional envelope. The envelope 210 may be any commercially available envelope. FIG. 6 further shows that the lamp 200 comprises a cap 220. The cap 220 may allow the lamp 200 to be safely and conveniently connected to a lamp holder. The cap 210 may comprise electronic components for providing electricity to LEDs and the LED filament 100. The lamp 200 may further comprise a controller configured to independently control different subsets of LEDs such as the first subset of LEDs 120 and the second subset of LEDs 130. The controller may also be used for a lighting device or a luminaire comprising an LED filament 100 i.e. not only for the lamp 200.

Figure 7A:
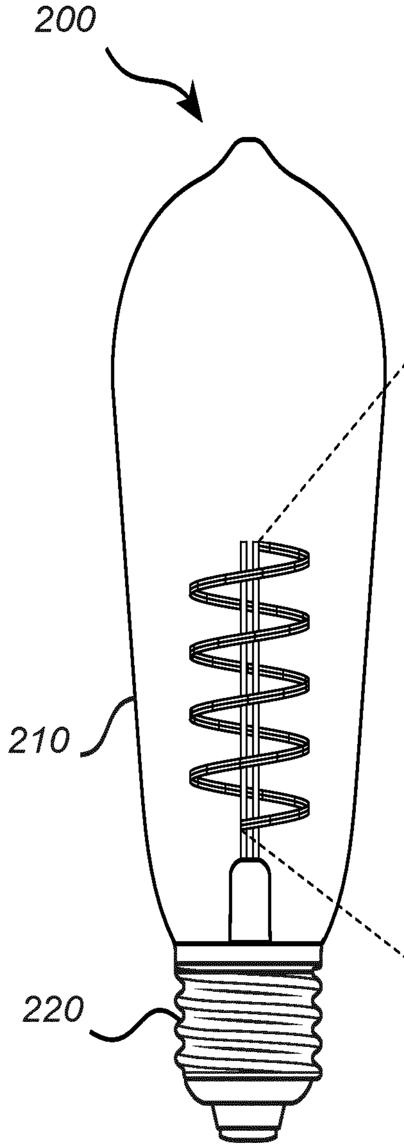
FIG. 7*a* schematically illustrates a lamp comprising an LED filament arranged in a helix.
Figure 7B:
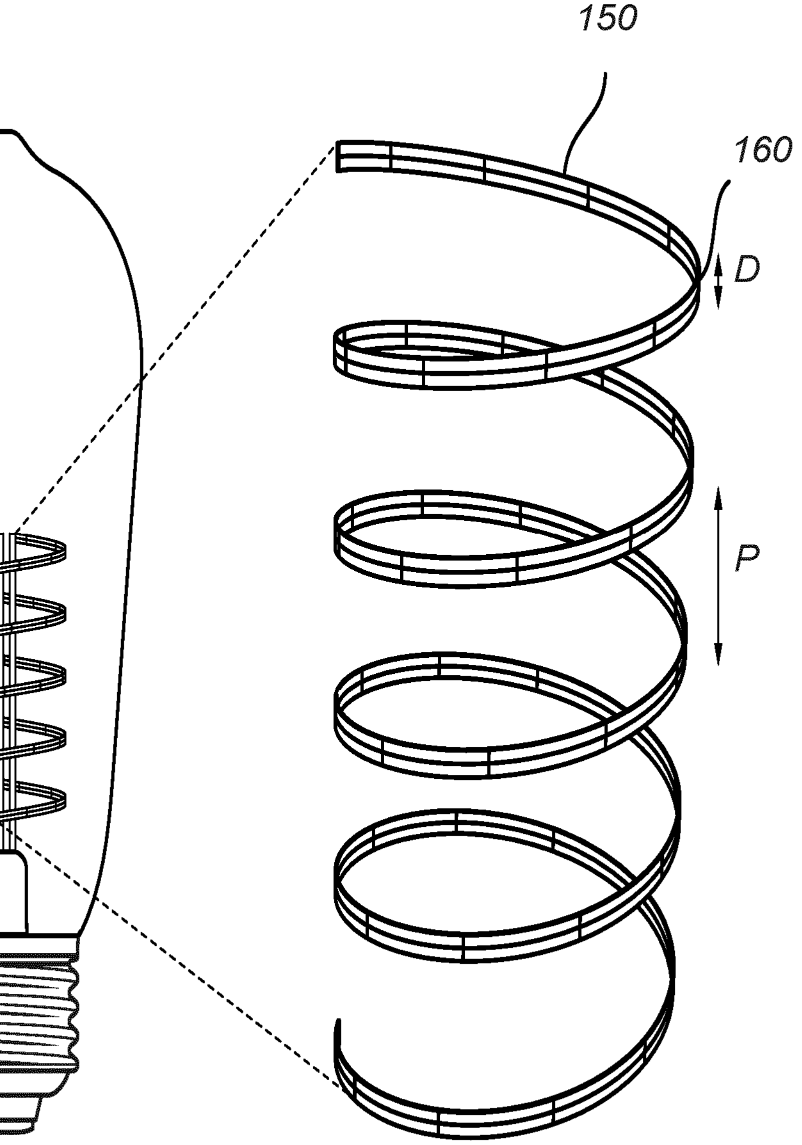
FIG. 7*b* schematically illustrates a magnified view of the LED filament of the lamp shown in FIG. 7*a*.

In connection with FIG. 7*a*, another lamp 200 is shown. The lamp 200 shown in FIG. 7*a* comprises an LED filament 100. A magnified view of the LED filament 100 shown in FIG. 7*a* is shown in FIG. 7*b*. The LED filament 100, shown in FIGS. 7*a* and 7*b*, comprises a reflective flexible carrier 110. The LED filament 100, shown in FIGS. 7*a* and 7*b*, is arranged as a helix. The LED filament 100, shown in FIGS. 7*a* and 7*b*, comprises a plurality of LEDs arranged in two columns of LEDs 150, 160. The two columns of LEDs 150, 160 may be arranged at a distance (D) from each other. The helix may have a pitch (P). The distance D between the two columns of LEDs 150, 160 may preferably be smaller than 30% percent of the pitch ($D<0.3$ P). The distance D between the two columns of LEDs 150, 160 may more preferably be smaller than 20% percent of the pitch ($D<0.2$ P). The distance D between the two columns of LEDs 150, 160 may most preferably be smaller than 10% percent of the pitch ($D<0.1$ P).

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An LED filament comprising:

a carrier comprising a plurality of LEDs arranged in at least two columns of LEDs, the carrier being light transmissive;

wherein the plurality of LEDs are grouped into at least two different subsets of LEDs, wherein a first subset of the LEDs is configured to emit light of a first color temperature, CT1, and a second subset of the LEDs is configured to emit light of a second color temperature, CT2, CT2 being different from CT1, the first subset of LEDs is encapsulated by a first encapsulant comprising a first luminescent material, the second subset of LEDs is encapsulated by a second encapsulant comprising a second luminescent material, and the first and second encapsulants are different;

wherein the LEDs of the at least two different subsets of LEDs are arranged in an alternating intersecting configuration in the at least two columns of LEDs such that each column comprises alternating segments configured to emit light of the first and the second color temperatures, respectively;

wherein the carrier is reflective and has two opposing surfaces, the at least two columns of LEDs are arranged on a first surface of the two opposing surfaces, and a second surface of the two opposing surfaces comprises at least two columns of LEDs arranged in the same way as the at least two columns of LEDs on the first surface, the at least two columns of LEDs on the first surface being evenly aligned on the first surface of the two opposing surfaces with the at least two columns of LEDs on the second surface of the two opposing surfaces between a proximal end and a distal end of the carrier; and wherein the at least two columns of LEDs are arranged as a single helix with the alternating segments of the at least two different subsets of LEDs emitting light of the first and the second color temperatures extending along the single helix.

2. The LED filament according to claim 1, wherein each subset of LEDs comprises a plurality of LEDs, wherein the plurality of LEDs in a subset of LEDs is electrically connected such that each subset of LEDs is independently controllable.

3. The LED filament according to claim 1, wherein a number of LEDs per segment is at least 3.

4. The LED filament according to claim 1, wherein a length of each segment is in a range of 5 to 30 mm.

5. The LED filament according to claim 1, wherein a length of the LED filament is in a range of 3 to 100 cm.

6. The LED filament according to claim 1, wherein the carrier is flexible.

7. The LED filament according to claim 1, wherein $CT1 > 2500$ K and $CT2 < 2500$ K, and wherein $CT1 - CT2 > 500$ K.

8. A lamp comprising an LED filament according to claim 1.

9. The lamp according to claim 1, wherein the at least two columns of LEDs are arranged at a distance (D) from each other, and the single helix has a pitch (P) such that $D < 0.3P$.

10. The lamp according to claim 1, wherein a distance between the at least two columns of LEDs is in a range of 0.05 to 3 mm.

* * * * *